Patented Dec. 15, 1931

1,836,171

UNITED STATES PATENT OFFICE

ERNST M. JOHANSEN, OF PHILADELPHIA, PENNSYLVANIA, ASSIGNOR TO THE GRAY PROCESSES CORPORATION, OF NEWARK, NEW JERSEY, A CORPORATION OF DELAWARE

PREPARATION OF MERCAPTANS

No Drawing.  Application filed August 13, 1929. Serial No. 385,699.

This invention relates to a process for producing sulphur compounds from hydrocarbons, more particularly to the production of sulphur compounds having the characteristic properties or mercaptans, from unsaturated hydrocarbons contained in or derived from petroleum or natural gas, or other similar mineral source.

This application is a continuation in part of my prior application Serial No. 117,866, filed June 22, 1926. The present invention is differentiated from the invention specifically covered by the claims in such prior application, in that a solid adsorbent material, as for example, fuller's earth, or the equivalent is used as a catalyst instead of a mineral acid.

I have found that the sulphur compounds of the character of mercaptans are produced by causing unsaturated hydrocarbons and hydrogen sulfide to react at temperatures of from 32° F. to 100° F., in the presence of catalysts of the solid adsorbent type, such as fuller's earth, charcoal, silica gel or the equivalent.

In accordance with this invention, unsaturated hydrocarbons, preferably those contained in a liquid fraction from petroleum, are cause to react with hydrogen sulfide at ordinary temperatures, as for example of the order of from 32° F. to 100° F., preferably by introducing the hydrogen sulfide into hydrocarbon material comprised at least in part of unsaturated hydrocarbons and thereafter passing the solution of hydrogen sulfite in the hydrocarbon material into contact with solid catalytic material, whereby sulphur derivatives of the hydrocarbon are formed having properties characteristic of the mercaptans. The introduction of hydogen sulfide into the hydrocarbon is continued for some period of time, such period being determined by the speed with which the fraction takes up the gas, or until sufficient of the gas has been dissolved in the fraction to react therewith to the extent desired. The resulting solution is then contacted with the adsorbent material. If desired, these steps may be repeated a number of times to effect complete reaction, which is evidenced by no further reaction taking place upon repetition thereof. In each instance the treated solution is separated from the adsorbent material before further treatment with hydrogen sulfide.

The hydrocarbon fraction after saturation with hydrogen sulfide, if desired, may be filtered through a bed of the adsorbent material, thereby to cause the reaction to take place and in effect making the process continuous.

It is, however, to be understood that the above is the preferred method and that my invention comprehends broadly the step of causing hydrogen sulfide to react with unsaturated hydrocarbons in the presence of a catalyst of the class described.

After the reaction between the hydrogen sulfide and the unsaturated hydrocarbons has been completed, the resulting solution may be subjected to distillation and re-distillation to eliminate any non-volatile substances present, and the distillate comprising a solution of the sulphur compounds results, which distillate I have found possesses characteristic mercaptan reactions.

The nature of the reaction between the unsaturated hydrocarbons and the hydrogen sulfide may be a direct addition of the gas to the hydrocarbons and may be illustrated by the formation of ethyl-mercaptan from ethylene and hydrogen sulfide according to the following equation, which may be considered as typical of that which takes place between hydrogen sulfide and any of the unsaturated hydrocarbons:

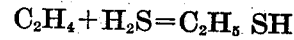

$$C_2H_4 + H_2S = C_2H_5 SH$$

As a more specific example of the present process, a liquid hydrocarbon fraction from a petroleum distillate, 9% by volume of which will react with sulphuric acid of 95% $H_2SO_4$ content, said fraction being free of mercaptans, and having a boiling range of from about 114° F. to about 414° F., and a sulphur content of 0.04% is treated by the preferred method as above described with hydrogen sulfide, then agitated with granular fuller's earth in the proportion of 20 parts by weight of fuller's earth to 60 parts by weight of the solution, until the hydrogen sulfide odor has substantially disappeared. The liquid is then separated from the fuller's earth and is then washed with a slight amount of dilute solution of sodium hydroxide to remove any traces of hydrogen sulfide remaining. The washed product obtained is found to contain compounds which give the usual reactions for mercaptans, in that they form metallic compounds and are easily transformed into disulfides. The resulting product contained 0.29% sulphur, an amount corresponding to about 1.0% mercaptans.

The sulphur compounds produced and present in the finished product obtained by the process described appear to be identical with those compounds recognized as present in various grades of crude petroleum and petroleum products, and known in the art of petroleum refining as "sour sulphur compounds".

For certain purposes, the solution of the sulphur compounds in the hydrocarbons, produced as above described, may be used directly, as for example, in the removal of free or elementary sulphur from petroleum products, or, if desired, may be concentrated. Also the mercaptans may be obtained in a purer form by fractional distillation. The solution may be utilized for the production of mercaptides, thus enabling the separation from the hydrocarbons, and the isolation of the mercaptans themselves.

It has been found that the product or products obtained by the present process may be utilized for all purposes for which mercaptans of corresponding purity may be used.

While the invention is set forth in detail specifically in the example given above, it is to be understood that applicant comprehends the process broadly and intends to be limited only by the scope of the appended claims.

What I claim is:

1. A process for producing sulfur compounds which comprises causing olefins to react with hydrogen sulfide in the presence of a solid adsorbent from the group consisting of fuller's earth, charcoal, and silica gel.

2. A process for producing sulfur compounds which comprises causing a liquid hydrocarbon fraction containing olefins to react with hydrogen sulfide at ordinary temperatures in the presence of a solid adsorbent from the group consisting of fuller's earth, charcoal, and silica gel.

3. A process for producing sulfur compounds which comprises causing a liquid hydrocarbon fraction containing olefins to react with hydrogen sulfide at temperatures between 32° F. and 100° F. in the presence of a solid adsorbent from the group consisting of fuller's earth, charcoal, and silica gel.

4. A process for producing sulfur compounds which comprises introducing hydrogen sulfide into a liquid containing olefins, passing the solution into contact with a solid adsorbent from the group consisting of fuller's earth, charcoal, and silica gel, separating the liquid from the adsorbent and washing the liquid with dilute alkali metal hydroxide.

5. A process for producing sulfur compounds which comprises introducing hydrogen sulfide into a liquid containing olefins, passing the solution into contact with a solid adsorbent from the group consisting of fuller's earth, charcoal, and silica gel, at temperatures between 32° F and 100° F., separating the liquid from the adsorbent and washing the liquid with dilute alkali metal hydroxide.

6. A process for producing sulfur compounds which comprises bringing olefins into contact with hydrogen sulfide and causing them to react at ordinary temperatures by having fuller's earth present.

7. The process of producing mercaptans which comprises subjecting hydrogen sulphide and olefins to the action of an adsorptive catalyst comprising one of the group consisting of fuller's earth and silica gel.

8. A process for producing sulphur compounds which comprises causing liquid olefins to react with hydrogen sulphide in the presence of a solid adsorbent from the group consisting of fuller's earth, charcoal and silica gel.

In testimony whereof I affix my signature.

ERNST M. JOHANSEN.